United States Patent
Hong et al.

(10) Patent No.: US 12,147,794 B2
(45) Date of Patent: Nov. 19, 2024

(54) PREDICTING AND/OR APPLYING SYMBOLIC TRANSFORMATION TEMPLATES

(71) Applicant: Google LLC, Mountain View, CA (US)

(72) Inventors: Joey Hong, Campbell, CA (US); Rishabh Singh, San Jose, CA (US); Joel Galenson, Santa Clara, CA (US); Jonathan Malmaud, Campbell, CA (US); Manzil Zaheer, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 128 days.

(21) Appl. No.: 18/070,015

(22) Filed: Nov. 28, 2022

(65) Prior Publication Data
US 2024/0176604 A1    May 30, 2024

(51) Int. Cl.
*G06F 8/51* (2018.01)
(52) U.S. Cl.
CPC ..................... *G06F 8/51* (2013.01)
(58) Field of Classification Search
CPC .......................................... G06F 8/51
USPC .................................. 717/136–139
See application file for complete search history.

(56) References Cited

U.S. PATENT DOCUMENTS

| | | | | |
|---|---|---|---|---|
| 10,331,781 B2* | 6/2019 | Buyukkokten | ....... | G06F 40/221 |
| 11,340,873 B2* | 5/2022 | Cangea | .................. | G06N 3/045 |
| 11,481,202 B2* | 10/2022 | Lewis | ..................... | G06N 3/045 |
| 11,487,521 B2* | 11/2022 | Antonevich | ............. | G06F 8/51 |
| 11,775,267 B2* | 10/2023 | Bronevetsky | ............. | G06F 8/38 |
| | | | | 717/110 |
| 11,886,850 B2* | 1/2024 | Lewis | ...................... | G06N 3/04 |
| 2006/0225052 A1* | 10/2006 | Waddington | ............. | G06F 8/51 |
| | | | | 717/136 |
| 2022/0261231 A1* | 8/2022 | Lewis | ...................... | G06F 8/71 |

OTHER PUBLICATIONS

Hartmann et al., "Using MDA for integration of heterogeneous components in software supply chains", 2013, Elsevier, pp. 2313-2330. (Year: 2013).*

(Continued)

*Primary Examiner* — Ted T. Vo
(74) *Attorney, Agent, or Firm* — Gray Ice Higdon

(57) ABSTRACT

Implementations are described herein for predicting symbolic transformation templates to automate source code transformations. In various implementations, pair(s) of predecessor and successor source code snippets may be processed using a symbolic transformation template prediction (STTP) model to predict a symbolic transformation template that includes a predecessor portion that matches the predecessor source code snippet(s) of the pair(s) and a successor portion that matches the successor source code snippet(s) of the pair(s). At least one additional predecessor source code snippet may be identified that matches the predecessor portion of the predicted symbolic transformation template. Placeholders of the predecessor portion of the predicted symbolic transformation template may be bound to one or more tokens of the at least one additional predecessor source code snippet to create binding(s). The successor portion of the predicted symbolic transformation template may be applied to the bindings to generate additional successor source code snippet(s).

20 Claims, 9 Drawing Sheets

(56) References Cited

OTHER PUBLICATIONS

Devlin et al., "RobustFill: Neural Program Learning under Noisy I/O" Proceedings of the 34th International Conference on Machine Learning, Sydney, Australia, PMLR 70, 2017. 9 pages, dated 2017.
Parisotto et al., "Neuro-Symbolic Program Synthesis" ICLR, 15 pages, dated 2017.
Yu et al., "A Survey on Neural-symbolic Systems" arXiv:2111.08164v1 [cs.LG] 17 pages, dated Nov. 10, 2021.
Garcez et al., "Neural-Symbolic Computing: An Effective Methodology for Principled Integration of Machine Learning and Reasoning" Journal of Applied Logics. IfCoLog Journal of Logics and Their Applications. vol. 6 No. 4, 21 pages, dated 2019.

\* cited by examiner

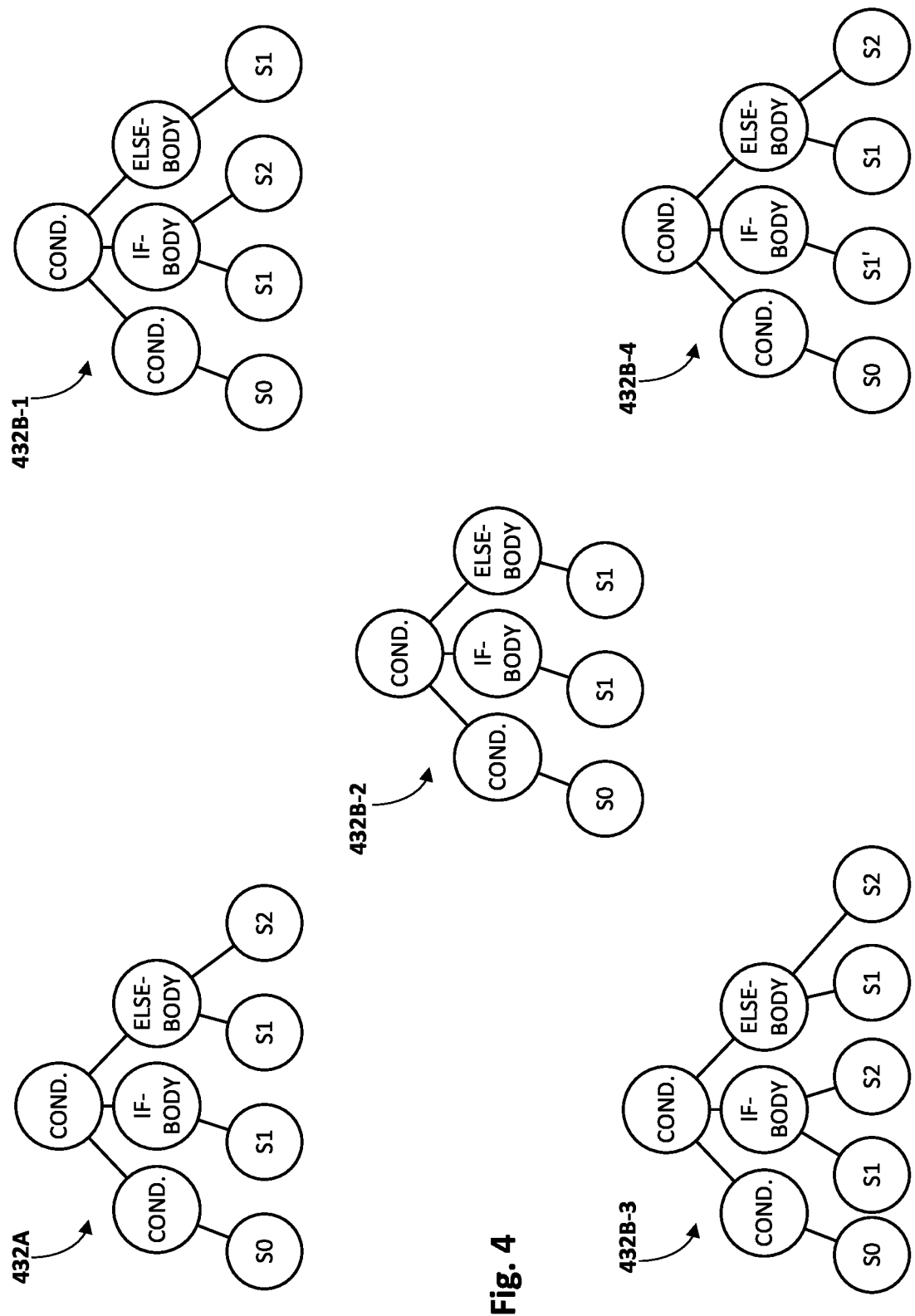

AUTO EDIT RECOMMENDATIONS

GIVEN YOUR PREFERENCES, WE HAVE IDENTIFIED A NUMBER OF PATTERNS IN THE SOURCE CODE THAT WE RECOMMEND UPDATING AUTOMATICALLY. PLEASE SELECT A FILENAME TO BE TAKEN TO THE FIRST FOUND PATTERN IN THAT FILE, OR SELECT AN INDIVIDUAL FOUND PATTERN TO BE TAKEN DIRECTLY TO THE SOURCE CODE SNIPPET IN QUESTION.

FOO.CC
    XRANGE(X)→RANGE(X)
    X.KEYS(Y)→LIST(X.KEYS(Y))
BAR.CC
    XRANGE(X)→RANGE(X)
    X.XRANGE(Y)→LIST(X.RANGE(Y))
    XRANGE(X)→RANGE(X)
    XRANGE(X, Y)→RANGE(X, Y)

PREDICTING AND/OR APPLYING SYMBOLIC TRANSFORMATION TEMPLATES

BACKGROUND

Source code maintenance often includes migration of source code, which is time consuming and expensive because it may require numerous transformations of source code snippets. Some large code bases may require numerous years' worth of engineer and/or programmer time in order to be migrated from one version to another. This type of work is often considered tedious and/or cumbersome, which may lead to mistakes being made and/or failure to implement transformations that are critical to the migration.

SUMMARY

Symbolic transformation templates may be heuristically formulated to generalize transformations made to multiple different source code snippets. These symbolic transformation templates may be subsequently applicable to other matching source code snippets to affect transformations automatically. However, this can be a resource-intensive process. For example, exhaustively enumerating all candidate symbolic transformation templates that would implement a particular source code transformation, and then selecting from those candidates based on various heuristics, may be computationally expensive and/or time-consuming, and therefore may not scale well to large and complex code migrations.

Implementations are described herein for predicting, as opposed to heuristically formulating, symbolic transformation templates to automate source code transformations. In various implementations, a machine learning model referred to herein as a "symbolic transformation template predictor" (STTP) model may be trained to predict symbolic transformation templates based on pairs of predecessor and successor source code snippets. Once trained, the STTP model can be applied to additional example(s) pairs of predecessor and successor source code snippet(s) to predict symbolic transformation template(s) in accordance with a distribution learned by the STTP model during training. A predicted symbolic transformation template may then be used subsequently to automate the transformation of source code snippet(s) that share attributes (e.g., token patterns) with each other and the symbolic transformation template.

In some implementations, a method implemented using one or more processors may include: processing one or more pairs of source code snippets using a STTP model, wherein each pair of source code snippets includes a respective predecessor source code snippet and a respective successor source code snippet; based on the processing, predicting a symbolic transformation template that includes a predecessor portion that matches the one or more predecessor source code snippets of the one or more pairs and a successor portion that matches the one or more successor source code snippets of the one or more pairs; identifying at least one additional predecessor source code snippet that matches the predecessor portion of the predicted symbolic transformation template; binding one or more placeholders of the predecessor portion of the predicted symbolic transformation template to one or more tokens of the at least one additional predecessor source code snippet to create one or more bindings; and applying the successor portion of the predicted symbolic transformation template to the one or more bindings to generate, and store in memory, at least one additional successor source code snippet.

In various implementations, the STTP model may be an attention-based transformer. In various implementations, the one or more pairs of source code snippets may include two or more pairs of source code snippets, and the predecessor portion may match each of the two or more predecessor source code snippets of the two or more pairs. In various implementations, the successor portion matches each of the two or more successor source code snippets of the two or more pairs.

In various implementations, the predecessor and successor portions of the symbolic transformation template may include variablized trees or graphs. In various implementations, the predecessor and successor portions of the symbolic transformation template may include variablized domain specific language (DSL) snippets.

In various implementations, the STTP model may be trained on a plurality of synthetic source code transformations. In some such implementations, a given synthetic source code transformation of the plurality may be generated using the following operations: processing a training predecessor source code snippet to generate a training predecessor graph; non-deterministically transforming the training predecessor graph into a training successor graph; based on the training predecessor and successor graphs, determining a training symbolic transformation template; and applying the training symbolic transformation template to the training predecessor source code snippet to generate a training synthetic successor source code snippet, wherein the training predecessor source code snippet and the training synthetic successor source code snippet together comprise the given synthetic source code transformation. In various implementations, the training predecessor and successor graphs may include abstract syntax trees (ASTs) and/or control flow graphs (CFGs). In various implementations, the training symbolic transformation template may include a variablized predecessor DSL snippet corresponding to the training predecessor graph and a variablized successor DSL snippet corresponding to the training successor graph.

In various implementations, the method may include causing to be presented, at a user interface of an integrated development environment (IDE), a tool that is operable to apply the predicted symbolic transformation template to other predecessor source code snippets in a code base that match the predecessor portion of the predicted symbolic transformation template.

In another related aspect, a method for generating a plurality of synthetic source code transformations to train a STTP model for automation of source code transformations may be implemented using one or more processors and may include: processing a training predecessor source code snippet to generate a training predecessor graph; non-deterministically transforming the training predecessor graph into a training successor graph; based on the training predecessor and successor graphs, determining a training symbolic transformation template; and applying the training symbolic transformation template to the training predecessor source code snippet to generate a training synthetic successor source code snippet, wherein the training predecessor source code snippet and the training synthetic successor source code snippet together comprise one of the synthetic source code transformations that are used to train the STTP model.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 4 depicts examples of tree operations that may be performed to generate synthetic training data, in accordance with various implementations described herein.

FIG. 5 depicts an example graphical user interface (GUI) that may be presented in accordance with various implementations described herein.

DETAILED DESCRIPTION

Figure 1:
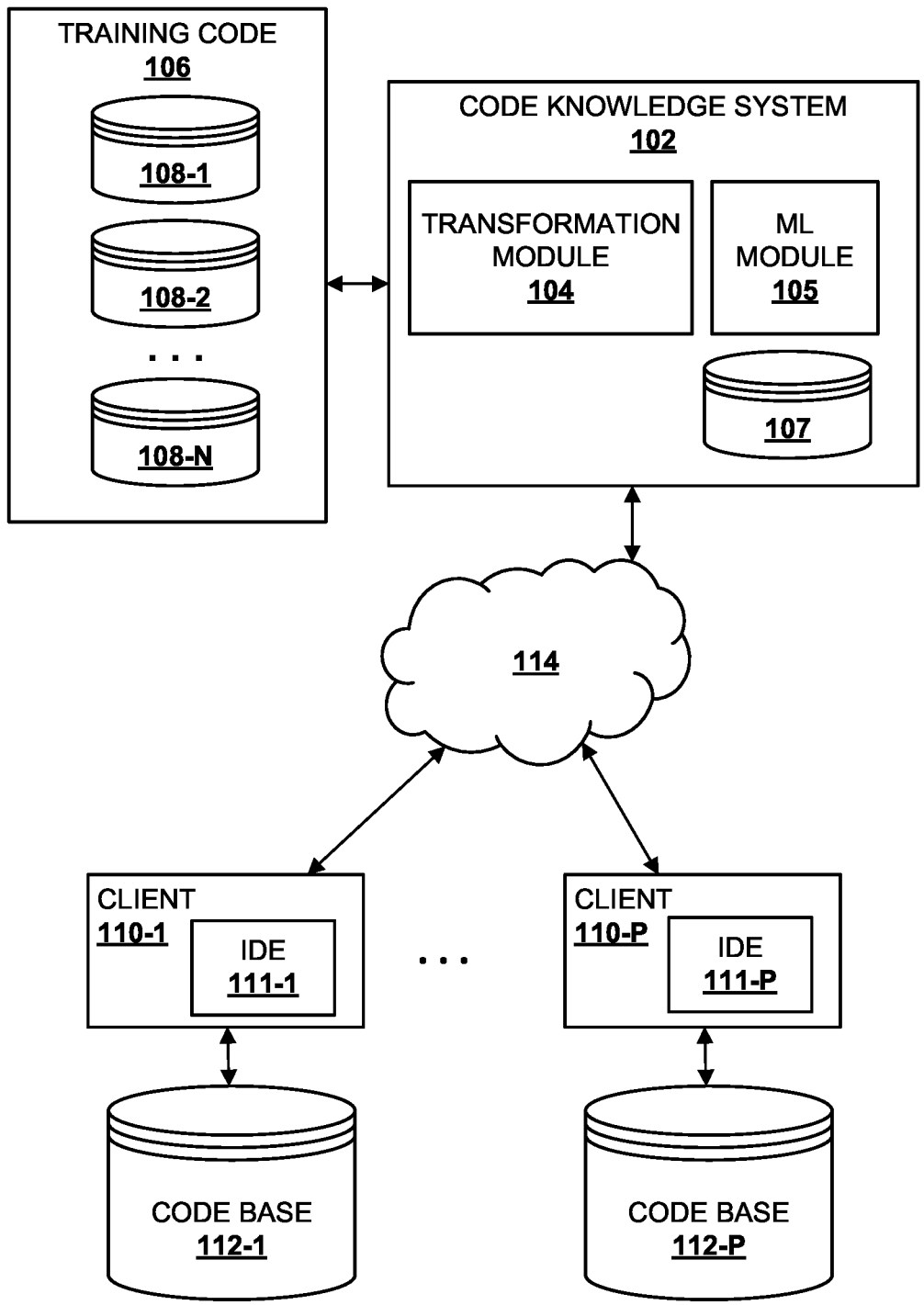
FIG. 1 schematically depicts an example environment in which selected aspects of the present disclosure may be implemented, in accordance with various implementations.

Symbolic transformation templates may be heuristically formulated to generalize transformations made to multiple different source code snippets. These symbolic transformation templates may be subsequently applicable to other matching source code snippets to affect transformations automatically. However, this can be a resource-intensive process. For example, exhaustively enumerating all candidate symbolic transformation templates that would implement a particular source code transformation, and then selecting from those candidates based on various heuristics, may be computationally expensive and/or time-consuming, and therefore may not scale well to large code migrations.

Implementations are described herein for predicting, as opposed to heuristically formulating, symbolic transformation templates to automate source code transformations. In various implementations, a machine learning model referred to herein as a "symbolic transformation template predictor" (STTP) model may be trained to predict symbolic transformation templates based on pairs of predecessor and successor source code snippets. Once trained, the STTP model can be applied to additional source code snippet(s) to predict symbolic transformation template(s) in accordance with a distribution learned by the STTP model during training. A predicted symbolic transformation template may then be used subsequently to automate the transformation of source code snippet(s) that share attributes (e.g., token patterns) with each other and the symbolic transformation template.

Symbolic transformation templates may be represented in various ways. In some implementations, a symbolic transformation template may include a predecessor portion and a successor portion. Each portion may include tokens that are held constant, as well as placeholder token(s) that, like wildcards, can be matched to multiple different token sequences. In some implementations, the predecessor and successor portions of the symbolic transformation template may be represented as graphs or trees, such as abstract syntax trees (ASTs) or a control flow graphs (CFGs). Additionally or alternatively, the predecessor and successor portions of the symbolic transformation template may be formulated in a domain-specific language (DSL) that describes source code in an abstract way (e.g., where at least some tokens of the source code snippet are "variablized" into placeholders). In some implementations, the graphs or trees may directly correspond to (e.g., represent, describe, map to) the DSL snippets. These symbolic transformation templates may be subsequently applicable to matching snippet(s) of new source code, e.g., so that the new source code can be at least partially transformed with little to no human effort.

The STTP model may take various forms, including sequence-to-sequence machine learning models such as attention-based transformers. In various implementations, supervised training of the STTP model may be performed using training examples that each include a predecessor source code snippet and successor source code snippet, as well as corresponding labels, e.g., symbolic transformation template that demonstrates how to transform from the predecessor to successor. However, it may be challenging to locate enough "real world" training examples to adequately perform supervised training of the STTP model. Accordingly, in various implementations, an existing repository of source code may be leveraged to generate synthetic source code transformations. These synthetic source code transformations may then be used as additional training data for the STTP model.

In some implementations, source code transformations may be synthesized by performing tree operations on graphs/trees representing existing source code snippets to generate synthetic variations. For example, an existing source code snippet may be used as a predecessor source code snippet, and hence may be converted into a predecessor graph (e.g., a tree), such as an AST or CFG. This predecessor graph/tree may be "variablized," meaning at least some tokens are replaced with "variables" or "placeholders." These replaced tokens are often those that are relatively tailored to a particular situation and/or tend to be unchanged during code transformations. The variablized predecessor graph/tree may correspond to (e.g., be mappable to, describe, etc.) a predecessor DSL snippet that describes the predecessor source code snippet in a variablized way, e.g., with at least some tokens replaced with placeholders.

Tree/node operations such as move, insert, delete, and update, may be performed on the variablized predecessor graph/tree, e.g., at random, to generate a variablized successor graph/tree. The variablized successor graph/tree may correspond to a successor DSL snippet that describes a synthetic successor source code snippet in a variablized way. Collectively, the predecessor and successor graphs/trees—and/or their corresponding predecessor and successor DSL snippets—may collectively form a synthetic symbolic transformation template.

This synthetic symbolic transformation template may then be applied to the predecessor source code snippet to generate a synthetic successor source code snippet. For example, one or more placeholders of the predecessor DSL snippet of the synthetic symbolic transformation template may be bound to token(s) of the predecessor source code snippet to create binding(s). The successor DSL snippet of the synthetic symbolic transformation template may be applied to the binding(s) to generate, and store in memory, the synthetic successor source code snippet.

Subsequently, the predecessor source code snippet and synthetic successor source code snippet may be used as a training example to train the STTP model. For instance, the predecessor source code snippet and synthetic successor source code snippet may be processed using the STTP model to generate a predicted symbolic transformation template. The predicted symbolic transformation template may then be compared with the synthetic symbolic transformation template. Any difference or "error" between the two may be used to train the STTP model, e.g., using techniques such as stochastic gradient descent, back propagation, etc.

FIG. 1 schematically depicts an example environment in which selected aspects of the present disclosure may be implemented, in accordance with various implementations. Any computing devices depicted in FIG. 1 or elsewhere in the figures may include logic such as one or more microprocessors (e.g., central processing units or "CPUs", graphical processing units or "GPUs", tensor processing units or ("TPUs")) that execute computer-readable instructions stored in memory, or other types of logic such as application-specific integrated circuits ("ASIC"), field-programmable gate arrays ("FPGA"), and so forth. Some of the systems depicted in FIG. 1, such as a code knowledge system 102, may be implemented using one or more server computing devices that form what is sometimes referred to as a "cloud infrastructure," although this is not required.

A code knowledge system 102 may be operably coupled with clients 110-1 to 110-P via one or more computer networks 114 to help clients 110-1 to 110-P manage their respective code bases 112-1 to 112-P. In other implementations, code knowledge system 102 may be implemented locally at a client 110. Code knowledge system 102 may include, among other things, a transformation module 104 and a machine learning (ML) module 105 that are configured to perform selected aspects of the present disclosure in order to help one or more clients 110-1 to 110-P to manage and/or make changes to one or more corresponding code bases 112-1 to 112-P. Each client 110 may be, for example, an entity or organization such as a business (e.g., financial institute, bank, etc.), non-profit, club, university, government agency, or any other organization that operates one or more software systems. For example, a bank may operate one or more software systems to manage the money under its control, including tracking deposits and withdrawals, tracking loans, tracking investments, and so forth. An airline may operate one or more software systems for booking/canceling/rebooking flight reservations, managing delays or cancellations of flight, managing people associated with flights, such as passengers, air crews, and ground crews, managing airport gates, and so forth.

Transformation module 104 may be configured to leverage ML module 105 and prior source code transformations contained in training code 106 to facilitate predicting/inferring and/or application of symbolic transformation templates to automate aspects of computer programming, e.g., to aid clients 110-1 to 110-P in editing, updating, replatforming, migrating, or otherwise acting upon their code bases 112-1 to 112-P. In some implementations, training code 106 may include multiple different corpuses 108-1 to 108-N of source code that can be leveraged in this manner. These corpuses 108-1 to 108-N may be publicly available, proprietary, stored on a cloud, stored in a version control system (VCS), and so forth.

In some examples, one or more corpuses 108 of training code 106 may include pre-migration and post-migration versions of source code that exist prior to and after migration of the source code, respectively. For example, a VCS may store all or at least some previous versions of source code. Based on analysis of these pre- and post-migration versions of source code, transformation module 104 may identify one or more transformations made to the pre-migration version of the source code to yield the post-migration version of the source code.

As used herein, a "symbolic transformation template" may include one or more rules for transforming a source code snippet. In some implementations, in each symbolic transformation template, different tokens are replaced with what are referred to herein as "placeholders" or "wildcards," while other tokens are preserved. Symbolic transformation templates may be represented in various ways, such as pairs of DSL snippets, one predecessor and the other successor, and/or as pairs of graphs, one predecessor and the other successor. In the latter case, subsequent source code to which the graph-based transformation template is to be applied may also be converted to graph form, such as an AST or CFG.

In some implementations, each client 110 may include an integrated development environment (IDE) 111 that can be used to edit/write source code. In other implementations, other applications may be used to edit source code, such as a simple text editor, a word processing application, a source code editor application with specific functionality to aid in computer programming, etc. Whether a programmer uses a standalone source code editor application or a source code editor module of an IDE 111, in many cases, the source code the programmer sees may be visually annotated, e.g., with different tokens being rendered in different colors to facilitate ease of reading. In some implementations, the source code editor may include extra functionality specifically designed to ease programming tasks, such as tools for automating various programming tasks, a compiler, real time syntax checking, etc. In some implementations, techniques described herein may enhance aspects of this extra functionality provided by a source code editor (whether a standalone application or part of an IDE), e.g., by generating and/or recommending code edit suggestions (e.g., to comport with prior successful transformations).

In various implementations, ML module 105 may have access to data indicative of one or more trained machine learning models (not depicted). These trained machine learning models, including the aforementioned STTP model, may take various forms, including but not limited to a graph-based network such as a graph neural network (GNN), graph attention neural network (GANN), or graph convolutional neural network (GCN), a sequence-to-sequence machine learning model such as an encoder-decoder, various flavors of a recurrent neural network ("RNN", e.g., long short-term memory, or "LSTM", gate recurrent units, or "GRU", etc.), and any other type of machine learning model that may be applied to facilitate selected aspects of the present disclosure. In some implementations, an attention-based transformer such as a BERT (Bidirectional Encoder Representations from Transformers) transformer may be trained as the STTP model to facilitate performance of selected aspects of the present disclosure.

In some implementations, ML module 105 may, e.g., at the behest of transformation module 104, train and/or apply a machine learning model stored in database 107, such as the STTP model, to facilitate prediction of symbolic transformation templates based on pairs of predecessor and successor source code snippets. These pairs of predecessor and successor source code snippets may come from various sources, during training and later, during inference. During training, it may be difficult to accumulate sufficient pairs of predecessor and successor source code snippets. Consequently, and as will be described herein, synthetic training data may be generated, e.g., based on unpaired source code snippets stored in one or more corpuses 108. During inference, pairs of predecessor and successor source code snippets may be derived from one or more source code files being edited by a user using IDE 111, and/or from source code files that are related to (e.g., dependent from) source code file(s) being edited by the user.

Figure 2:
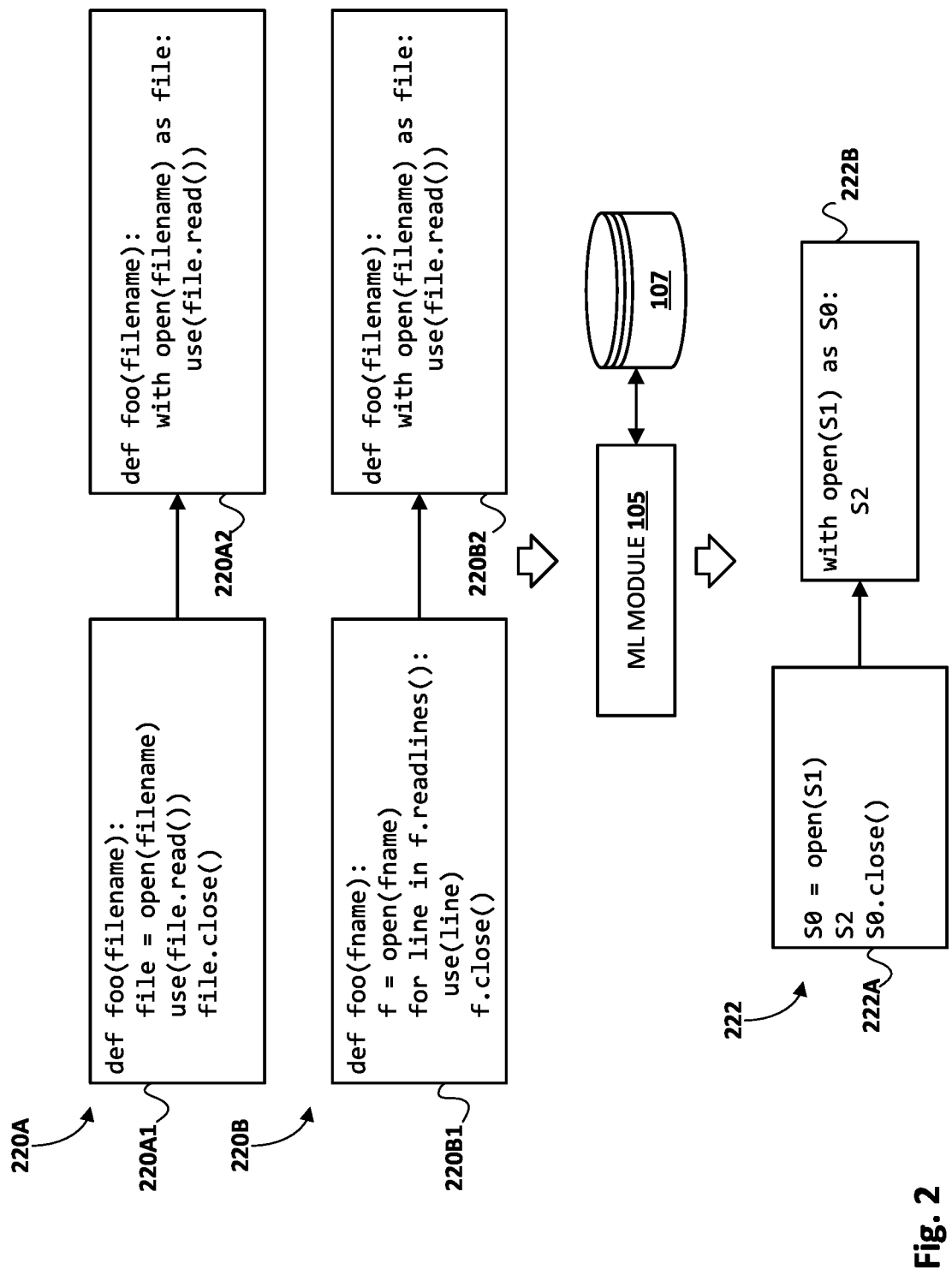
FIG. 2 schematically demonstrates an example of how aspects of the present disclosure may be implemented, in accordance with various implementations.

FIG. 2 schematically depicts a goal of techniques described herein. In particular, FIG. 2 schematically demonstrates an example of how one or more pairs 220A, 220B of predecessor and successor source code snippets can be processed, e.g., by ML module 105, to generate a predicted symbolic transformation template 222. Starting at top left, a first pair of source code snippets 220A includes a first successor source code snippet 220A1 and a first successor source code snippet 220A2. A second pair of source code snippets 220B includes a second successor source code snippet 220B1 and a second successor source code snippet 220B2. These source code snippets may, for instance, be derived from work being performed by a user using IDE 111. For example, the user may transform (e.g., edit) first predecessor source code snippet 220A1 to first successor source code snippet 220A2, and then may transform (e.g., edit) second predecessor source code snippet 220B1 to second successor source code snippet 220B2.

As shown by the white arrow, these source code snippets may be processed by ML module 105 using the STTP model (represented generally by 107) to generate predicted symbolic transformation template 222. Predicted symbolic transformation template 222 includes a first portion 222A and a second portion 222B. First portion 222A includes a DSL snippet that generalizes across both first predecessor source code snippet 220A1 and second predecessor source code snippet 220B1. Likewise, second portion 222B includes a DSL snippet that generalizes across both first successor source code snippet 220A2 and second successor source code snippet 220B2. Symbolic transformation template 222 may subsequently be applicable to any source code that matches the generalization represented by the DSL snippet corresponding to first portion 222A.

In some implementations, more than one symbolic transformation template may be generated based on pair(s) of predecessor and successor source code snippets. For example, beam searching may be performed with a beam width of x>1, such that x candidate symbolic transformation templates may be predicted. In some implementations, a user of an IDE 111 may be presented with the multiple candidate symbolic transformation templates, e.g., along with results of application of those templates to other matching source code snippets. This may allow the user to select the symbolic transformation template that achieves the user's goal regarding the matching source code snippets.

In other implementations, one or more of these candidate symbolic transformation templates may be selected automatically for subsequent application based on various criteria. These criteria may include, for instance, preservation of programming language built-in keyword(s) and/or idioms in and/or across the candidate symbolic transformation template. Programming language built-in keywords such as function names or other operators—especially if imported from standard or commonly-used application programming interfaces (APIs)—may be particularly important to preserve. Function arguments, on the other hand, may be transient between different instances of the same function call.

Other criteria for selecting from the x candidate symbolic transformation templates are contemplated. In some implementations, these criteria may include successful application of the candidate symbolic transformation template to another pre-transformation version of a source code snippet to accurately generate a post-transformation version of the source code snippet. If the candidate symbolic transformation template does not properly transform some other sampled source code snippet from a pre-transformation version to a post-transformation version, that candidate symbolic transformation template can be discarded, or a score associated with it may be decremented. As another example, the criteria may include a count of transformations being implementable using the candidate symbolic transformation template, e. g., across a source code file, across source code underlying an application, across an entire code base, etc. One broader candidate symbolic transformation template that is applicable to multiple source code snippets may be more likely selected than a narrower candidate symbolic transformation template that is only applicable to a single source code snippet.

Figure 3:
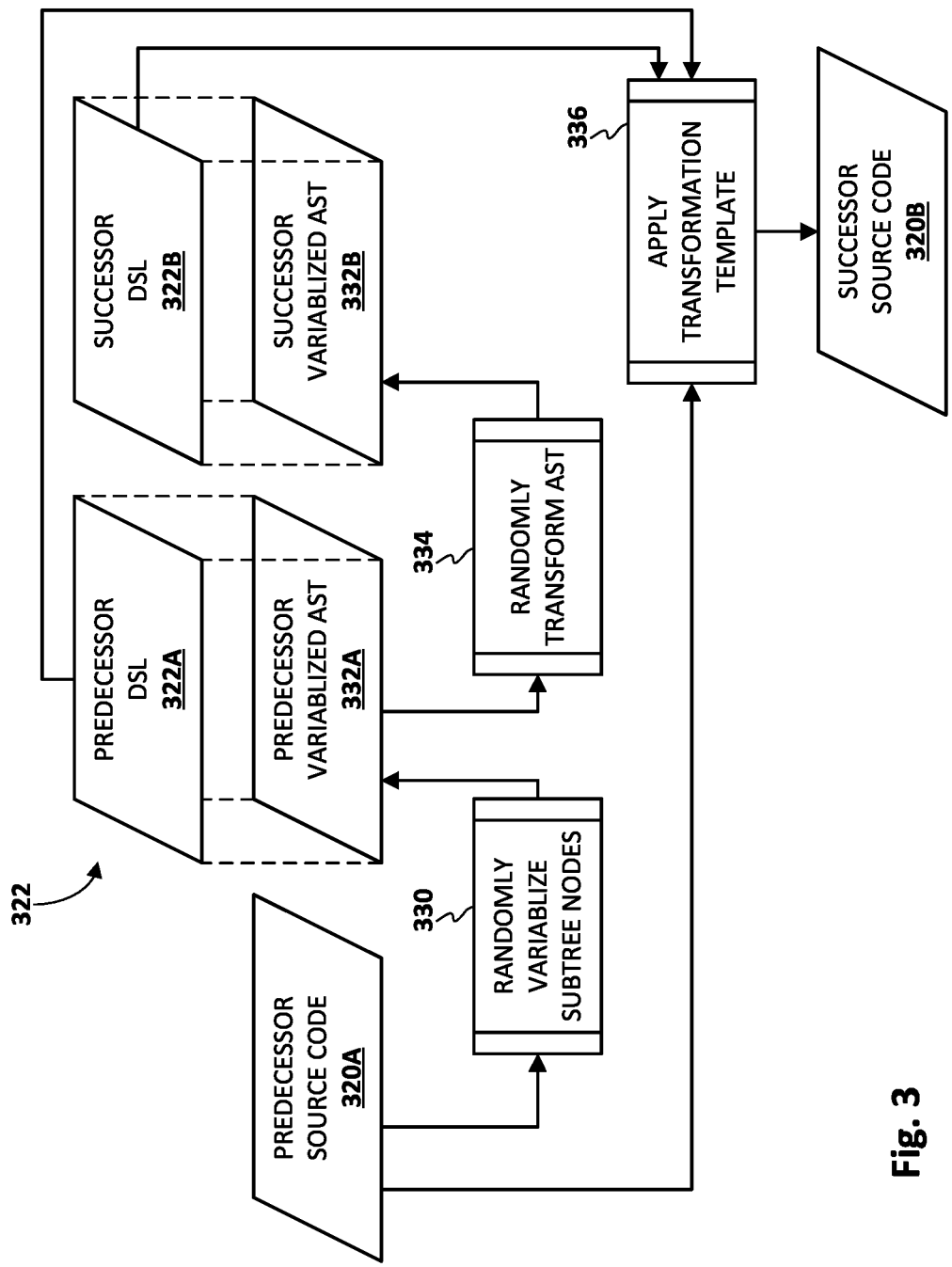
FIG. 3 depicts another example of how aspects of the present disclosure may be implemented, in accordance with various implementations.

As noted previously, obtaining sufficient training data to perform supervised training of the STTP model may be difficult, e.g., due to not enough predecessor and successor source code snippet pairs being available. Accordingly, techniques are described herein for automatically generating, with minimal or no human effort, synthetic training data. FIG. 3 schematically depicts one such example technique.

Starting at left, a predecessor source code snippet 320A may be obtained, e.g., from a private or public codebase or code repository (e.g., 108). At operation 330, a graph and/or tree representing predecessor source code snippet 320A, e.g., an AST or CFG, may be generated (e.g., using a compiler), and various subtree nodes may be variablized to generate a predecessor variablized AST 332A. For example, tokens and/or line(s) source code that can be generalized and/or abstracted may be identified and replaced with placeholder(s). As one example, with first predecessor source code snippet 220A1 in FIG. 2, the token "file" was replaced with the placeholder "S0", the token "filename" was replaced with the placeholder "S1", and the source code tokens "use(file.read( ))" were generalized to "S2". Likewise, with second predecessor source code snippet 220B1 in FIG. 2, the token "f" was replaced with the placeholder "S0", the token "fname" was replaced with the placeholder "S1", and the source code tokens "for line in f.readlines ( ): use(line)" were generalized to "S2".

Referring back to FIG. 3, predecessor variablized AST 332A may correspond to (e.g., map to, represent) a predecessor DSL snippet 322A, which may, for instance, share characteristic(s) with first portion 222A of predicted symbolic transformation template 222 in FIG. 2. At operation 334, predecessor variablized AST 332A may be randomly transformed, e.g., by having one or more nodes or subtrees moved, inserted, deleted, updated, etc. Examples of these operations will be explained in association with FIG. 4. The result of operation 334 is a successor variablized AST 332B. As with predecessor variablized AST 332A, successor variablized AST 332B may correspond to a successor DSL snippet 322B, which may, for instance, share characteristic(s) with second portion 222B of predicted symbolic transformation template 222 in FIG. 2.

In various implementations, predecessor and successor variablized ASTs 332A and 332B may be combined to form a training symbolic transformation template 322. Additionally or alternatively, predecessor and successor variablized DSL snippets 322A and 322B may be combined to form a training symbolic transformation template 322. In either case, as shown by the arrows, at operation 336, the training symbolic transformation template 322 may be applied to predecessor source code snippet 320A to generate a synthetic successor source code snippet 320B.

Predecessor source code snippet 320A and synthetic successor source code snippet 320B may then be used as a training example for supervised training of the STTP model. For example, the STTP model may be used to process predecessor source code snippet 320A and synthetic successor source code snippet 320B to generate a predicted symbolic transformation template. That predicted symbolic transformation template may be compared to, for instance, the training symbolic transformation template 322 formed by predecessor and successor DSL snippets 322A, 322B. Any difference(s) (or error) between them may be used to train the machine learning model, e.g., using techniques such as stochastic gradient descent, back propagation, etc.

The process depicted in FIG. 3 may allow for the automatic/programmatic generation of large numbers (hundreds of thousands, millions, billions) of training examples with little to no human effort. To ensure the machine learning model that predicts symbolic transformation templates learns a suitable distribution, different types of transformations should be included. Examples of such transformations are depicted in FIG. 4.

Referring now to FIG. 4, at top left, a predecessor variablized AST 432A is depicted. Predecessor variablized AST 432A may share characteristics with, for instance, predecessor variablized AST 332A in FIG. 3. It should be understood that FIG. 4 is for illustrative purposes only and is not necessarily meant to depict real-life ASTs. Predecessor variablized AST 432A includes, as a root node, a condition ("cond."), with three children nodes, including a child condition node, an "if-body" node, and an "else-body" node. The child condition node includes its own child node that represents source code that has been replaced with the placeholder S0. The "if-body" node has its own child node that represents source code that has been replaced with the placeholder S1. And the "else-body" node has two children nodes representing source code that has been replaced with the respective placeholders, S1 and S2.

At top right, an example successor variablized AST 432B-1 is depicted after a "move-sibling(Node1, Node2)" operation is performed on predecessor variablized AST 432A. In this example, the S2 leaf node has been moved from being a child of the "else-body" node to being a child of the "if-body" node. More generally, the "move-sibling (Node1, Node2)" operation may move a subtree rooted at Node1 in the AST to the immediate right sibling of Node2. As explained previously, these ASTs may correspond to predecessor and successor DSL snippets, and hence, to a symbolic transformation template. As one example, this "move sibling" operation be represented by a symbolic transformation template that includes, as a predecessor portion, the DSL snippet "foo(S0, S1, replace=True)," and as a successor portion, the DSL snippet "foo(S1, S0, replace=True)." As an example of how this operation may affect source code, the following predecessor source code snippet:

```
data = ""
if condition:
    data = dictionary["message"]
``` may be transformed into the following successor source code snippet:

```
if condition:
    data = dictionary["message"]
else:
    data = ""
```

As a variation, a "move-parent(Node1, Node2)" operation may move a subtree rooted at Node1 to the rightmost child of Node2.

In the middle of FIG. 4, another example successor variablized AST 432B-2 is depicted after a "delete-node (Node)" operation is performed on predecessor variablized AST 432A. In this example, the S2 leaf node has been deleted. More generally, a delete-node(Node) operation may delete the Node but may preserve the deleted node's children. Example DSL snippets for a delete-node(Node) operation in which a function name "foo" is deleted may include, as a predecessor DSL snippet, "S0=foo(S1)", and as a successor DSL snippet, "S0=S1". As an example of how this operation may affect source code, the following predecessor source code snippet:

```
for i in mylist:
    if i != 2:
        mylist2.append(i)
    else:
        continue
``` may be transformed into the following successor source code snippet:

```
for i in mylist:
    if i != 2:
        mylist2.append(i)
```

As a variation, a "delete-subtree(Node)" operation may delete an entire subtree rooted at Node.

Referring back to FIG. 4, at bottom left, an example successor variablized AST 432B-3 is depicted after a node has been inserted to predecessor variablized AST 432A. In this example, a second S2 leaf node has been added to the "if-body" node. One challenge with inserting nodes is that the insert operation is not required to operate on nodes of predecessor variablized AST 432A. Accordingly, in various implementations, an insertion transformation may be affected on predecessor variablized AST 432A may perform a delete-node(Node) operation in reverse. For example, a random node may be deleted from predecessor variablized AST 432A to generate a version of predecessor variablized AST 432A that lacks the deleted node. Then, these two ASTs may be swapped, such that predecessor variablized AST 432A becomes the synthetic successor variablized AST, and the variablized AST that lacks the deleted node (and initially was the successor) is now treated as a predecessor variablized AST.

At bottom right in FIG. 4, another example successor variablized AST 432B-4 is depicted after a node has been updated via an update(Node1, Node2) operation in which Node1 is replaced with Node2. Here, the S1 node that is the child of the "if-body" node is replaced with an S1' node. An operation that updates a node may be reflected in DSL snippets in various ways. As one example, changing a variable name may result in a predecessor DSL snippet of "S0=5+S1" to be transformed to a successor DSL snippet of "S0=5+S0". As another example, changing a value of an attribute may result in a predecessor DSL snippet of "S0.key" to be transformed to a successor DSL snippet of "S0.value". As yet another example, changing an operator in a boolean or arithmetic expression may result in a predecessor DSL snippet of "a=(S0<5)" to be transformed to a successor DSL snippet of "a=(S0>=f)".

FIG. 5 depicts an example GUI that may be presented to a user to recommend one or more auto edits, and for facilitating navigation to relevant portions of source code for potential transformation. In this example, a number of instances of source code that match various symbolic transformation templates have been identified in a codebase. For example, the file "foo.cc" includes two instances of source code that match two different symbolic transformation templates: a first instance that matches a symbolic transformation template that transforms the function call "xrange" to "range" while preserving (via the placeholder X) argument(s) that are passed to the function; and a second instance that matches a symbolic transformation template that wraps a KEYS call in a LIST call. Similarly, the file "bar.cc" also includes a number of applicable transformations. In various implementations, the programmer may be able to select (e.g., click) any of the filenames and/or the instances of applicable symbolic transformation templates to be taken directly to the corresponding locations in source code. In various implementations, these transformations may be implemented automatically, or the user may have the option of accepting them, rejecting them, and/or modifying them.

Figure 6:
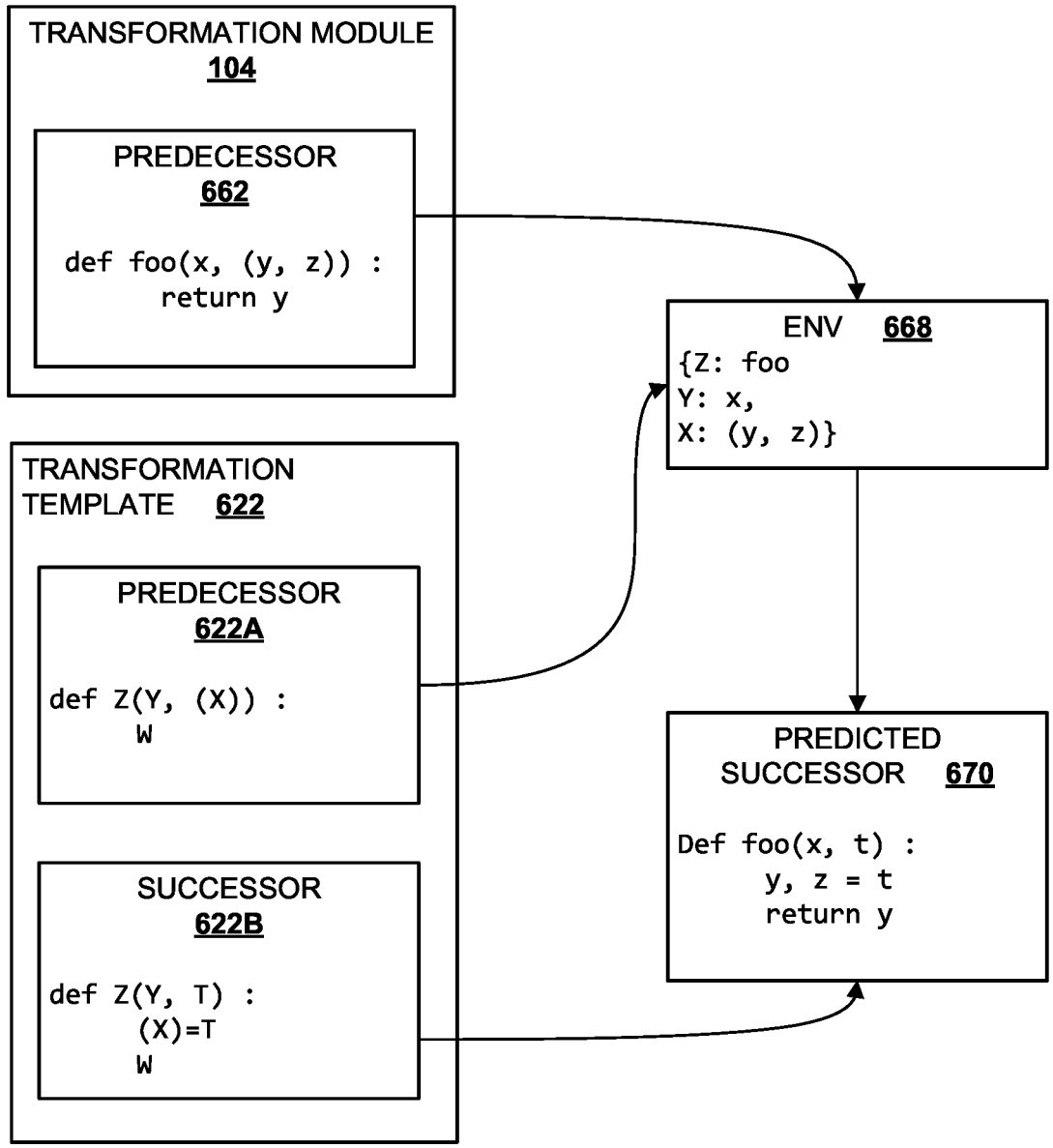
FIG. 6 depicts another example of how aspects of the present disclosure may be implemented, in accordance with various implementations.

FIG. 6 schematically depicts a non-limiting example of how a symbolic transformation template 622, which may have been predicted using techniques described herein and may share characteristics with elements 222 in FIGS. 2 and 322 in FIG. 3, may be applied to automatically generate a successor source code snippet 670 from a predecessor source code snippet 662. Placeholders/variables of predecessor portion 622A (which may share characteristics with elements 222A of FIGS. 2 and 322A of FIG. 3) of symbolic transformation template 622 may be bound to token(s) of predecessor source code snippet 662 at block 668. For example, the placeholder Z is bound to the programmer-defined function name "foo." The placeholder Y is bound to the programmer-defined variable x. And the placeholder X is bound to the programmer-defined variables (y, z). Once the placeholders of predecessor portion 622A of symbolic transformation template 222 are bound, successor portion 222B of symbolic transformation template 222 may be applied to these bindings to generate predicted successor source code snippet 670. The resulting prediction is shown in FIG. 6 at 670.

Figure 7:
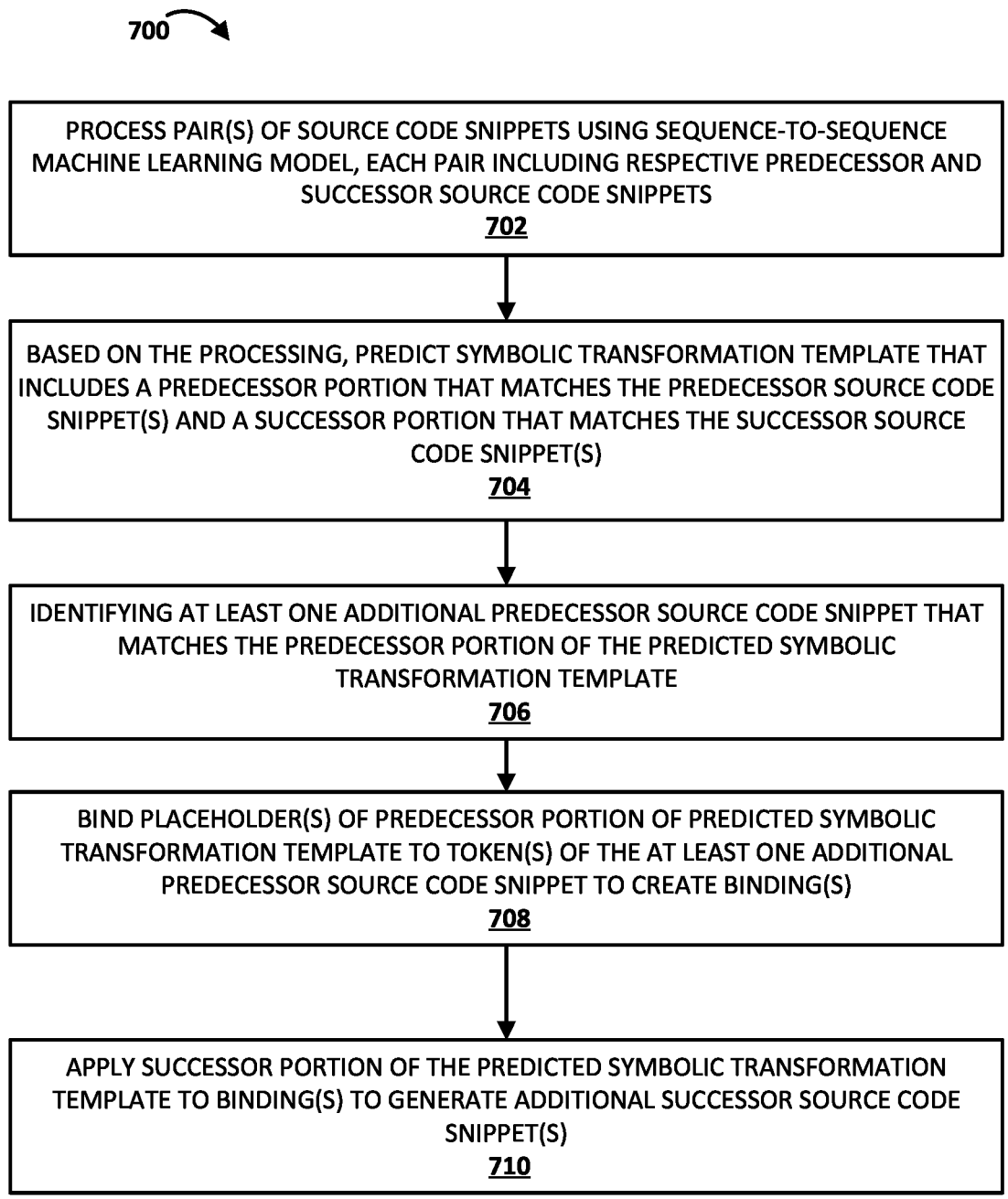
FIG. 7 depicts a flowchart illustrating an example method for practicing selected aspects of the present disclosure.

FIG. 7 is a flowchart illustrating an example method 700 of practicing selected aspects of the present disclosure, in accordance with implementations disclosed herein. For convenience, the operations of the flow chart are described with reference to a system that performs the operations. This system may include various components of various computer systems, such as one or more components of code knowledge system 102. Moreover, while operations of method 700 are shown in a particular order, this is not meant to be limiting. One or more operations may be reordered, omitted or added.

At block 702, the system, e.g., by way of ML module 105, may process one or more pairs of source code snippets using the STTP model. Each pair of source code snippets may include a respective predecessor source code snippet and a respective successor source code snippet. In order to avoid naïve solutions, in some implementations, multiple pairs of source code snippets may be processed at once using the STTP model. This may generate a predicted symbolic transformation template that generalizes across all of the pairs of predecessor and successor source code snippets. However, this is not meant to be limiting, and it is possible to predict a symbolic transformation template from a single pair of processor and successor source code snippets.

Referring back to FIG. 7, based on the processing at block 702, at block 704, the system, e.g., by way of ML module 105 or transformation module 104, may predict a symbolic transformation template that includes a predecessor portion that matches (e.g., generalizes) the one or more predecessor source code snippets of the one or more pairs and a successor portion that matches (e.g., generalizes) the one or more successor source code snippets of the one or more pairs. As noted previously, the predecessor and successor portions of the predicted symbolic transformation template may take various forms, such as variablized graphs/tree such as ASTs or CFGs, variablized DSL snippets, etc.

At block 706, the system, e.g., by way of transformation module 104, may identify at least one additional predecessor source code snippet that matches the predecessor portion of the predicted symbolic transformation template. For example, if a user is currently making changes to source code for a particular application, the source code the user is working on and/or multiple source code files of that application's source code may be searched for source code patterns that match the predecessor portion of the predicted symbolic transformation template. If a full code base migration is being performed, all or substantial parts of the code based may be searched for source code patterns that match the predecessor portion of the predicted symbolic transformation template.

At block 708, the system, e.g., by way of transformation module 104, may bind one or more placeholders of the predecessor portion of the predicted symbolic transformation template to one or more tokens of the at least one additional predecessor source code snippet to create one or more bindings. An example of this was depicted in FIG. 6. At block 710, the system, e.g., by way of transformation module 104, may apply the successor portion of the predicted symbolic transformation template to the one or more bindings to generate, and store in memory (e.g., random-access memory of the user's computer, memory allocated to IDE 111, etc.), at least one additional successor source code snippet.

Figure 8:
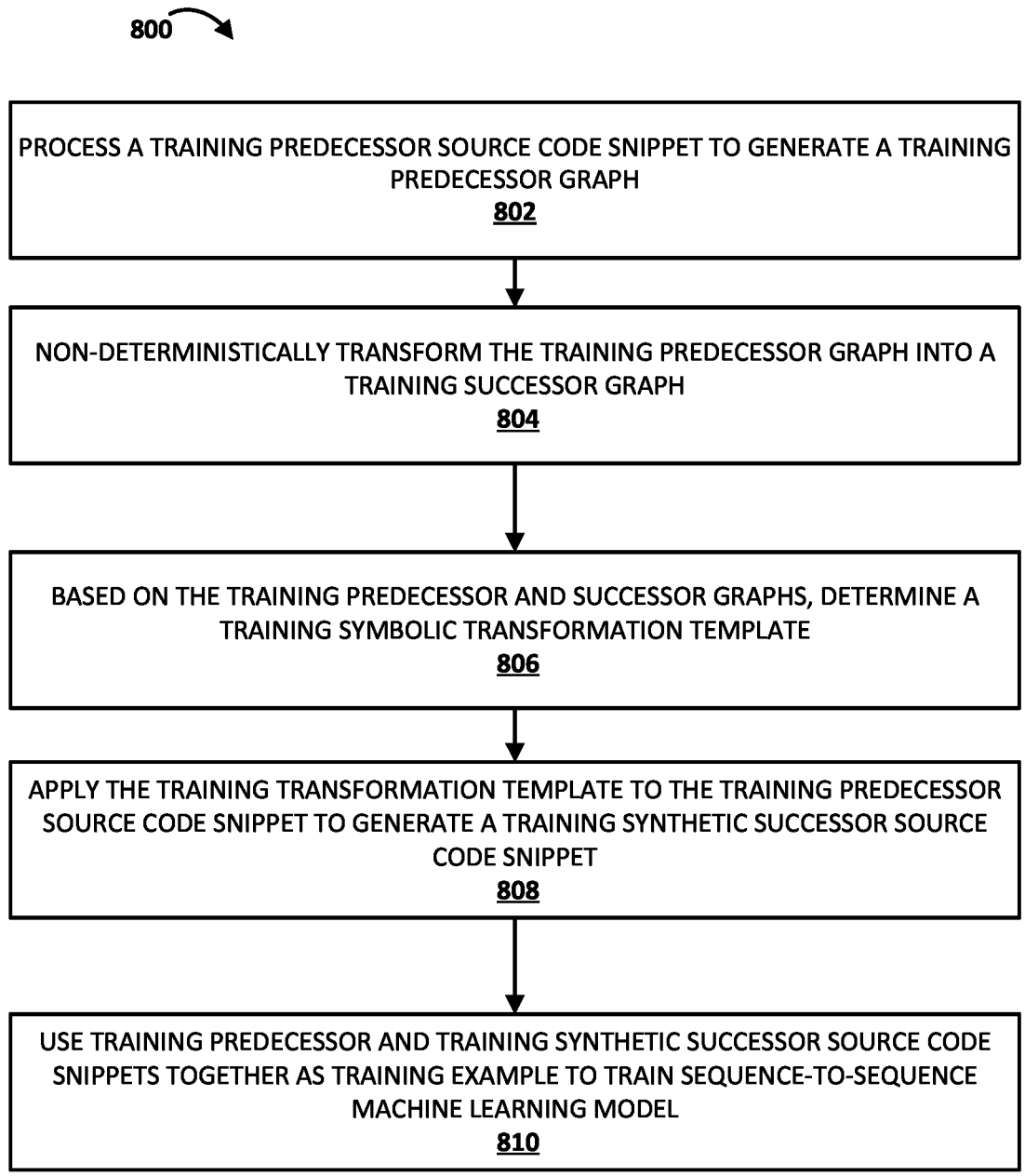
FIG. 8 depicts another flowchart illustrating an example method for practicing selected aspects of the present disclosure.

FIG. 8 is a flowchart illustrating an example method 800 of practicing selected aspects of the present disclosure, in accordance with implementations disclosed herein. For convenience, the operations of the flow chart are described with reference to a system that performs the operations. This system may include various components of various computer systems, such as one or more components of code knowledge system 102. Moreover, while operations of method 800 are shown in a particular order, this is not meant to be limiting. One or more operations may be reordered, omitted or added.

At block 802, and similar to block 330 of FIG. 3, the system may process a training predecessor source code snippet (e.g., 220A, 320A) to generate a training predecessor graph (e.g., 332A), which as noted previously may be a variablized AST or CFG in some implementations. This training predecessor graph may correspond to a DSL snippet, such as predecessor DSL snippet 322A in FIG. 3.

At block 804, the system may non-deterministically transform the training predecessor graph into a training successor graph (e.g., 332B), similar to block 334 of FIG. 3. This training successor graph may correspond to a DSL snippet, such as successor DSL snippet 322B in FIG. 3. Based on the training predecessor and successor graphs (e.g., 332A, 332B in FIG. 3), at block 806, the system may determine a training symbolic transformation template. For example, the predecessor DSL 322A and successor DSL 322B in FIG. 3 may collectively form the training symbolic transformation template.

At block 808, and similar to block 336 of FIG. 3, the system may apply the training symbolic transformation template to the training predecessor source code snippet (e.g., 320A) to generate a training synthetic successor source code snippet. In various implementations, at block 810, the system may use the training predecessor source code snippet (e.g., 320A) and the training synthetic successor source code snippet (e.g., 320B) together as a training example for training the STTP model.

As noted previously, in order to avoid naïve solutions, in some implementations, multiple pairs of source code snippets may be processed at once using the STTP model. This may generate a predicted symbolic transformation template that generalizes across all of the pairs of predecessor and successor source code snippets. This principle may also be practiced during training of the STTP model. When generating synthetic training data, e.g., as illustrated in FIG. 8, multiple training examples may be generated from a single predecessor source code snippet. For example, portions of the predecessor source code snippet that would be variablized (e.g., replaced with placeholders) may also be perturbed (e.g., randomly, with noise added, heuristically, etc.) to generate alternative versions of the predecessor source code snippet. The original predecessor source code snippet and its perturbed variations may then be used to generate multiple synthetic successor source code snippets as described previously. These multiple pairs of predecessor and successor source code snippets may then be used together to train the STTP model. As a result, the STTP model may avoid being overfitted to naïve solutions.

Figure 9:
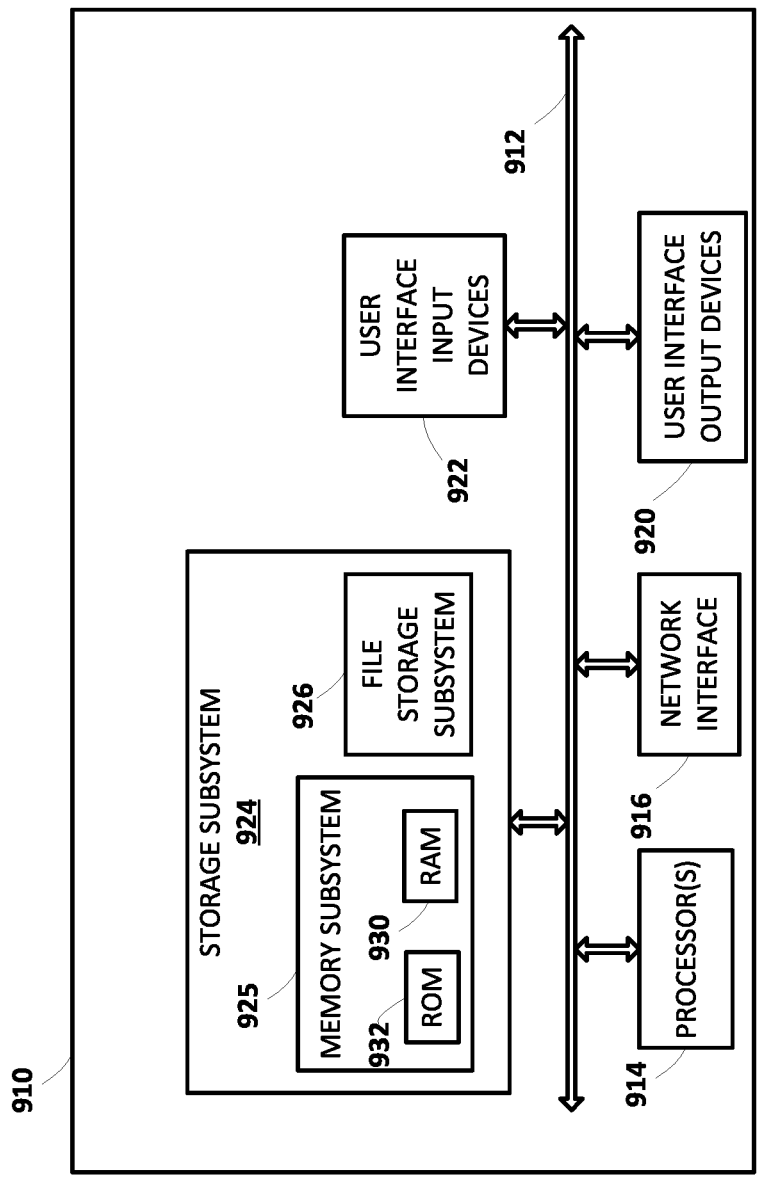
FIG. 9 illustrates an example architecture of a computing device.

FIG. 9 is a block diagram of an example computing device 910 that may optionally be utilized to perform one or more aspects of techniques described herein. Computing device 910 typically includes at least one processor 914 which communicates with a number of peripheral devices via bus subsystem 912. These peripheral devices may include a storage subsystem 924, including, for example, a memory subsystem 925 and a file storage subsystem 926, user interface output devices 920, user interface input devices 922, and a network interface subsystem 916. The input and output devices allow user interaction with computing device 910. Network interface subsystem 916 provides an interface to outside networks and is coupled to corresponding interface devices in other computing devices.

User interface input devices 922 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 910 or onto a communication network.

User interface output devices 920 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 910 to the user or to another machine or computing device.

Storage subsystem 924 stores programming and data constructs that provide the functionality of some or all of the modules described herein. For example, the storage subsystem 924 may include the logic to perform selected aspects of the method of FIGS. 7-8, as well as to implement various components depicted in FIGS. 1-3.

These software modules are generally executed by processor 914 alone or in combination with other processors. Memory 925 used in the storage subsystem 924 can include a number of memories including a main random-access memory (RAM) 930 for storage of instructions and data during program execution and a read only memory (ROM) 932 in which fixed instructions are stored. A file storage subsystem 926 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 926 in the storage subsystem 924, or in other machines accessible by the processor(s) 914.

Bus subsystem 912 provides a mechanism for letting the various components and subsystems of computing device 910 communicate with each other as intended. Although bus subsystem 912 is shown schematically as a single bus, alternative implementations of the bus subsystem may use multiple busses.

Computing device 910 can be of varying types including a workstation, server, computing cluster, blade server, server farm, or any other data processing system or computing device. Due to the ever-changing nature of computers and networks, the description of computing device 910 depicted in FIG. 9 is intended only as a specific example for purposes of illustrating some implementations. Many other configurations of computing device 910 are possible having more or fewer components than the computing device depicted in FIG. 9.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors and comprising:
   processing one or more pairs of source code snippets using a symbolic transformation template prediction (STTP) model, wherein each pair of source code snippets includes a respective predecessor source code snippet and a respective successor source code snippet;
   based on the processing, predicting a symbolic transformation template that includes a predecessor portion that matches the one or more predecessor source code snippets of the one or more pairs and a successor portion that matches the one or more successor source code snippets of the one or more pairs;
   identifying at least one additional predecessor source code snippet that matches the predecessor portion of the predicted symbolic transformation template;
   binding one or more placeholders of the predecessor portion of the predicted symbolic transformation template to one or more tokens of the at least one additional predecessor source code snippet to create one or more bindings; and
   applying the successor portion of the predicted symbolic transformation template to the one or more bindings to generate, and store in memory, at least one additional successor source code snippet.

2. The method of claim 1, wherein the STTP model comprises an attention-based transformer.

3. The method of claim 1, wherein the one or more pairs of source code snippets comprise two or more pairs of source code snippets, and the predecessor portion matches each of the two or more predecessor source code snippets of the two or more pairs.

4. The method of claim 3, wherein the successor portion matches each of the two or more successor source code snippets of the two or more pairs.

5. The method of claim 1, wherein the predecessor and successor portions of the symbolic transformation template comprise variablized trees or graphs.

6. The method of claim 1, wherein the predecessor and successor portions of the symbolic transformation template comprise variablized domain specific language (DSL) snippets.

7. The method of claim 1, wherein the STTP model is trained on a plurality of synthetic source code transformations, wherein a given synthetic source code transformation of the plurality is generated using the following operations:
   processing a training predecessor source code snippet to generate a training predecessor graph;
   non-deterministically transforming the training predecessor graph into a training successor graph;
   based on the training predecessor and successor graphs, determining a training symbolic transformation template; and
   applying the training symbolic transformation template to the training predecessor source code snippet to generate a training synthetic successor source code snippet,
   wherein the training predecessor source code snippet and the training synthetic successor source code snippet together comprise the given synthetic source code transformation.

8. The method of claim 7, wherein the training predecessor and successor graphs comprise abstract syntax trees (ASTs).

9. The method of claim 7, wherein the training predecessor and successor graphs comprise control flow graphs (CFGs).

10. The method of claim 7, wherein the training symbolic transformation template includes a variablized predecessor DSL snippet corresponding to the training predecessor graph and a variablized successor DSL snippet corresponding to the training successor graph.

11. The method of claim 1, further comprising causing to be presented, at a user interface of an integrated development environment (IDE), a tool that is operable to apply the predicted symbolic transformation template to other predecessor source code snippets in a code base that match the predecessor portion of the predicted symbolic transformation template.

12. A method for generating a plurality of synthetic source code transformations to train a symbolic transformation template prediction (STTP) model for automation of source code transformations, the method implemented using one or more processors and comprising:
   processing a training predecessor source code snippet to generate a training predecessor graph;
   non-deterministically transforming the training predecessor graph into a training successor graph;
   based on the training predecessor and successor graphs, determining a training symbolic transformation template; and
   applying the training symbolic transformation template to the training predecessor source code snippet to generate a training synthetic successor source code snippet,
   wherein the training predecessor source code snippet and the training synthetic successor source code snippet together comprise one of the synthetic source code transformations that are used to train the STTP model.

13. The method of claim 12, wherein the training predecessor and successor graphs comprise abstract syntax trees (ASTs) or control flow graphs (CFGs).

14. The method of claim 12, wherein the training symbolic transformation template includes a variablized predecessor domain specific language (DSL) snippet corresponding to the training predecessor graph and a variablized successor DSL snippet corresponding to the training successor graph.

15. A system comprising one or more processors and memory storing instructions that, in response to execution by the one or more processors, cause the one or more processors to:
   process one or more pairs of source code snippets using a symbolic transformation template prediction (STTP) model, wherein each pair of source code snippets includes a respective predecessor source code snippet and a respective successor source code snippet;
   based on output generated using the STTP model, predict a symbolic transformation template that includes a predecessor portion that matches the one or more predecessor source code snippets of the one or more pairs and a successor portion that matches the one or more successor source code snippets of the one or more pairs;

identify at least one additional predecessor source code snippet that matches the predecessor portion of the predicted symbolic transformation template;

bind one or more placeholders of the predecessor portion of the predicted symbolic transformation template to one or more tokens of the at least one additional predecessor source code snippet to create one or more bindings; and apply the successor portion of the predicted symbolic transformation template to the one or more bindings to generate, and store in memory, at least one additional successor source code snippet.

16. The system of claim 15, wherein the STTP model comprises an attention-based transformer.

17. The system of claim 15, wherein the one or more pairs of source code snippets comprise two or more pairs of source code snippets, and the predecessor portion matches each of the two or more predecessor source code snippets of the two or more pairs.

18. The system of claim 17, wherein the successor portion matches each of the two or more successor source code snippets of the two or more pairs.

19. The system of claim 15, wherein the predecessor and successor portions of the symbolic transformation template comprise variablized trees or graphs.

20. The system of claim 15, wherein the predecessor and successor portions of the symbolic transformation template comprise variablized domain specific language (DSL) snippets.

* * * * *